(12) United States Patent
Boogert et al.

(10) Patent No.: US 12,380,632 B1
(45) Date of Patent: Aug. 5, 2025

(54) SYSTEMS AND METHODS FOR EFFICIENT COMPRESSION AND DECOMPRESSION OF SPLAT REPRESENTATIONS OF THREE-DIMENSIONAL OBJECTS

(71) Applicant: Illuscio, Inc., Culver City, CA (US)

(72) Inventors: Donald Makoto Boogert, Vancouver (CA); Thomas Matterson, Breaker Bay (NZ); Timothy Ebling, Woodinville, WA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 19/043,588

(22) Filed: Feb. 3, 2025

(51) Int. Cl.
  *G06T 1/20* (2006.01)
  *G06T 7/55* (2017.01)
  *G06T 9/00* (2006.01)
  *G06T 15/04* (2011.01)
  *G06T 15/20* (2011.01)
  *G06T 17/20* (2006.01)

(52) U.S. Cl.
  CPC .......... *G06T 15/20* (2013.01); *G06T 1/20* (2013.01); *G06T 7/55* (2017.01); *G06T 9/00* (2013.01); *G06T 15/04* (2013.01); *G06T 17/20* (2013.01); *G06T 2210/56* (2013.01)

(58) Field of Classification Search
  CPC .... G06T 1/20; G06T 7/55; G06T 9/00; G06T 15/04; G06T 15/20; G06T 2210/56
  USPC ................................................. 345/501, 555
  See application file for complete search history.

(56) References Cited

U.S. PATENT DOCUMENTS 10,424,083 B2 * 9/2019 Sinharoy ................. G06T 9/001
11,095,920 B2 * 8/2021 Fleureau ............... H04N 19/597

OTHER PUBLICATIONS

Panagiotis Papantonakis et al., Reducing the Memory Footprint of 3D Gaussian Splatting, Proceedings of the ACM on Computer Graphics and Interactive Techniques, vol. 7, Issue 1, Article 16, May 2024, pp. 16:1-16:17.*

* cited by examiner

*Primary Examiner* — Jacinta M Crawford
(74) *Attorney, Agent, or Firm* — Ansari Katiraei LLP; Arman Katiraei; Sadiq Ansari

(57) ABSTRACT

A splat compression system and associated methods are provided to efficiently compress and decompress data of a three-dimensional (3D) splat representation using textures so that the size of the splat representation is reduced with minimal loss in fidelity. The compression includes receiving the splats that make up the 3D splat representation, determining clusters that are associated with a different set of the splats that are positioned about a different common plane, and defining each cluster with a position based on the positional data from the different set of splats associated with that cluster. The compression includes converting the positional data from the different set of splats associated with each cluster to offsets from the position of the associated cluster, and generating the compressed 3D representation with a definition for each cluster and a texture that stores the offsets for the different set of splats associated with each cluster.

20 Claims, 7 Drawing Sheets

SYSTEMS AND METHODS FOR EFFICIENT COMPRESSION AND DECOMPRESSION OF SPLAT REPRESENTATIONS OF THREE-DIMENSIONAL OBJECTS

BACKGROUND

Gaussian splats provide a format for representing three-dimensional (3D) objects with less data and similar accuracy than point clouds or mesh representations of the same 3D object. To generate a Gaussian splat representation of a 3D object, a radiance field, neural network, or machine learning process iteratively generates different sets of splats to compare against different images of the 3D object from different perspectives. The generated sets of splats are discarded or refined until a set of splats are found that represent the 3D object with an acceptable amount of loss.

Splat representations of a 3D object are typically smaller in size relative to point cloud or mesh representations of the same 3D object as fewer Gaussian splats are needed to represent the shapes, features, and visual characteristics of the 3D object relative to points or meshes of the other 3D formats. Even so, the splat representations are large files that are not suitable for streaming over data networks or for rendering by devices with lesser resources.

As with point clouds and mesh representations, the size of a splat representation may be reduced by reducing the number of 3D primitives (e.g., Gaussian splats) that are used to represent the 3D object. For instance, fewer larger-sized splats may represent the 3D object with greater fidelity loss albeit with less data than more smaller-sized splats. However, there is a need to reduce the size of a splat representation without reducing the number of splats that represent the 3D object such that there is less loss to the fidelity or quality of the splat representation than when reducing the size by reducing the number of splats in the encoding.

DETAILED DESCRIPTION OF PREFERRED EMBODIMENTS

The following detailed description refers to the accompanying drawings. The same reference numbers in different drawings may identify the same or similar elements.

Provided are systems and associated methods for efficient compression and decompression of splats from a splat representation of a three-dimensional (3D) object. The 3D object may include a full scene, environment, or multiple distinct visual elements. The compression and decompression involves adapting textures, that are used for other 3D formats or imaging, for the storage of splat positional data and/or other splat data. The storage of the splat data in one or more textures may yield up significant reductions (e.g., 25% of more) in the total size of the splat representation with minimal, insignificant, or unnoticeable loss in fidelity, quality, or detail. In particular, every splat from an original or uncompressed splat representation may be regenerated based on the compressed positional data that is stored in the one or more textures with no or minimal deviation in the position, scale, or orientation of each regenerated splat relative to an original uncompressed splat.

The textures provide a highly optimized format that may be processed directly on Graphics Processing Units (GPUs) and/or other graphics processing hardware resources. By moving the texture decoding and splat regeneration to the GPU, the Central Processing Unit (CPU) and/or other processing resources that are under contention are freed and made available for other tasks or operations. Moreover, since the GPU is optimized for texture decoding and processing, a device that receives or renders the compressed splat representation may use the GPU to decompress or decode the spatial data from the textures with almost no performance delay. More specifically, the GPU may have thousands of shaders or compute units that may simultaneously regenerate different sets of splats for different regions of the splat representation. Consequently, the rendering time of the compressed splat representation is almost the same or insignificantly different than the rendering of an uncompressed splat representation.

Figure 1:
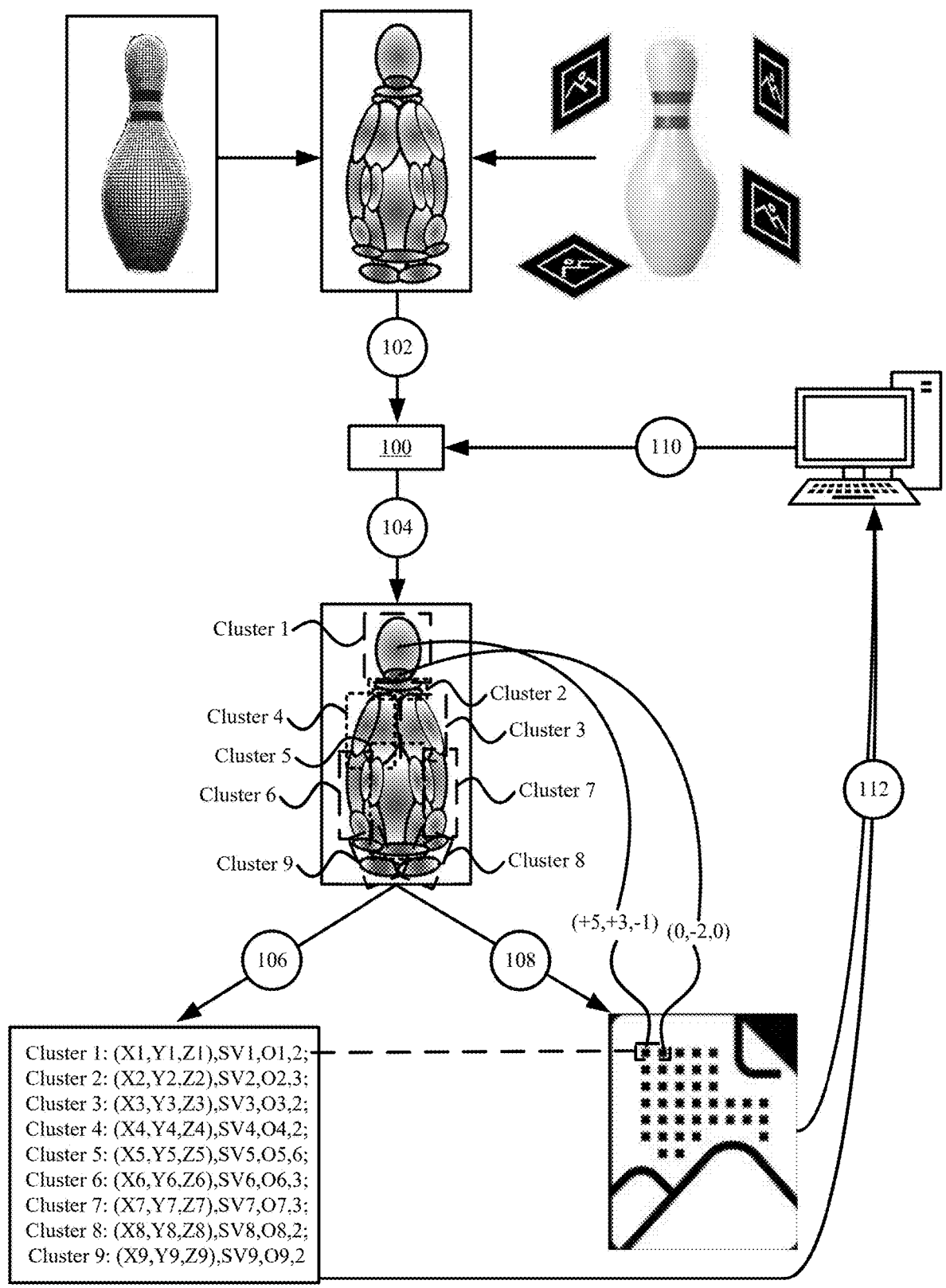
FIG. 1 illustrates an example of compressing splat positional data to one or more textures in order to reduce the size of a splat representation with minimal or no fidelity loss in accordance with some embodiments presented herein.

FIG. 1 illustrates an example of compressing splat positional data to one or more textures in order to reduce the size of a splat representation with minimal or no fidelity loss in accordance with some embodiments presented herein. Splat compression system 100 receives (at 102) a splat representation of a 3D object. The splat representation represents the shape, form, structure, and visual characteristics of the 3D object with a set of splats that are distributed in a 3D space. Each splat is defined with positional data and visual characteristic data. The positional data includes coordinates in a 3D space (e.g., x, y, and z values), a scaling value for the radius or shape of the splat, orientation or rotational information, and/or a covariance. The splats may have an oval, ellipsoidal, cylindrical, conical, spherical, or other parameterized shape that spans a region or volume of the 3D space. The visual characteristic data may include opacity, color values, and/or spherical harmonics. The splats may correspond to Gaussian splats or other splat definitions that differ from the Gaussian splats based on one or more different parameters defining the positional data or the visual characteristic data.

In some embodiments, the splat representation is generated from two-dimensional (2D) images that capture the 3D object from different angles or perspectives and using a radiance field, neural network, or other machine learning process that implements Gaussian splatting to model the 3D object from the different angles or perspectives with splats. In some other embodiments, the splat representation is generated from converting another 3D format (e.g., a point cloud or mesh representation of the 3D object) to the splat representation.

Splat compression system 100 clusters (at 104) different sets of splats from the splat representation based on positional coherence. In particular, splat compression system 100 analyzes the positioning of the splats to identify and select two or more neighboring splats that are positioned about a common plane or that form a flat surface. At a micro scale, segments or portions of any 3D object may lie on a common plane or be represented by a flat surface. In other words, splat compression system 100 may select each cluster to include positionally adjacent splats that have a common positional coordinate, orientation, and rotation or that deviate from a common plane by less than a threshold amount. Each cluster may include a different number of splats with some clusters including a single splat when none of the other neighboring splats are positioned about a same plane as that splat.

Splat compression system 100 defines (at 106) each cluster with one or more of a position, orientation, scaling value, offset, and a number of elements. The cluster position represents a position within the splat representation where the set of splats for that cluster are located. Specifically, the cluster position may be used as a basis or reference position from which a localized coordinate system for the set of splats in that cluster is defined. The splat positions may then be converted from the larger 3D space of the overall splat representation to the localized coordinate system of the cluster. The conversion defines the splat positions relative to the cluster position so that the positions of the splats may be represented in a compressed format by encoding the smaller range of values for the localized coordinate system with less bits. The smaller range of values may be also be quantized as they may be repeated across the clusters. Since the set of splats of a given cluster are defined about a common plane, the set of splats have a common orientation. The common orientation is defined as the cluster orientation, thereby reducing the size of the dataset by storing one orientation value for all the splats of a cluster rather than redundantly defining the same orientation value for each splat in the cluster. Similarly, the cluster scaling value may be used to scale each splat of the set of splats in a given cluster rather than defining the scaling value for each splat separately. The cluster offset specifies a position within a texture where the positional data for the associated splats begins and the number of elements specifies the amount of compressed splat positional data to read from the texture at the offset position.

Splat compression system 100 compresses the positional data of each splat from the set of splats of a given cluster into one or more textures. For instance, the x, y, and z coordinates for the splats in a cluster may be mapped (at 108) to a first texture and the orientation or scaling values for the splats in a cluster may be mapped (at 108) to a second texture. Mapping (at 108) the positional data may include defining the positions of each splat that is grouped to a given cluster in the localized coordinate system of that given cluster rather than in the much larger 3D space of the original splat representation. More specifically, the coordinates of a splat are converted from coordinates in the global 3D space of the splat representation to offsets from the position of the cluster to which that splat is grouped. Consequently, fewer bits or smaller data types may be used to store the positional values of the splats in the textures. In this manner, the textures may store the splat positional data in a compressed or reduced format.

Splat compression system 100 receives (at 110) a request to view, download, or otherwise access the 3D object. The request may include a Uniform Resource Locator (URL), name, directory path, or other identifier associated with the 3D object.

Splat compression system 100 distributes (at 112) the cluster definitions and the one or more textures in response to the request. The cluster definition and the one or more textures may be used to stream or transfer the splat representation with less data than if the positional data and visual characteristic data of each splat was streamed or transferred.

The requesting device receives the cluster definitions and the one or more textures. Using the cluster offsets and number of elements, the requesting device decodes the original number of splats from the textures and regenerates the splats at their original positions by referencing the cluster position and the positional data that is decoded for each splat from the one or more textures. Regenerating the splats may include orienting the splats according to the cluster orientation and scaling the splats according to the cluster scaling value.

The decoding of the splat positional data from the textures and/or the regeneration of the splats may occur entirely on the requesting device GPU or with the same hardware resources that are used to map or project texture data onto image data (e.g., 3D model or 2D image). As the GPU is highly optimized for processing of the textures, millions of splats may be regenerated in tens or hundreds of milliseconds.

Figure 2:
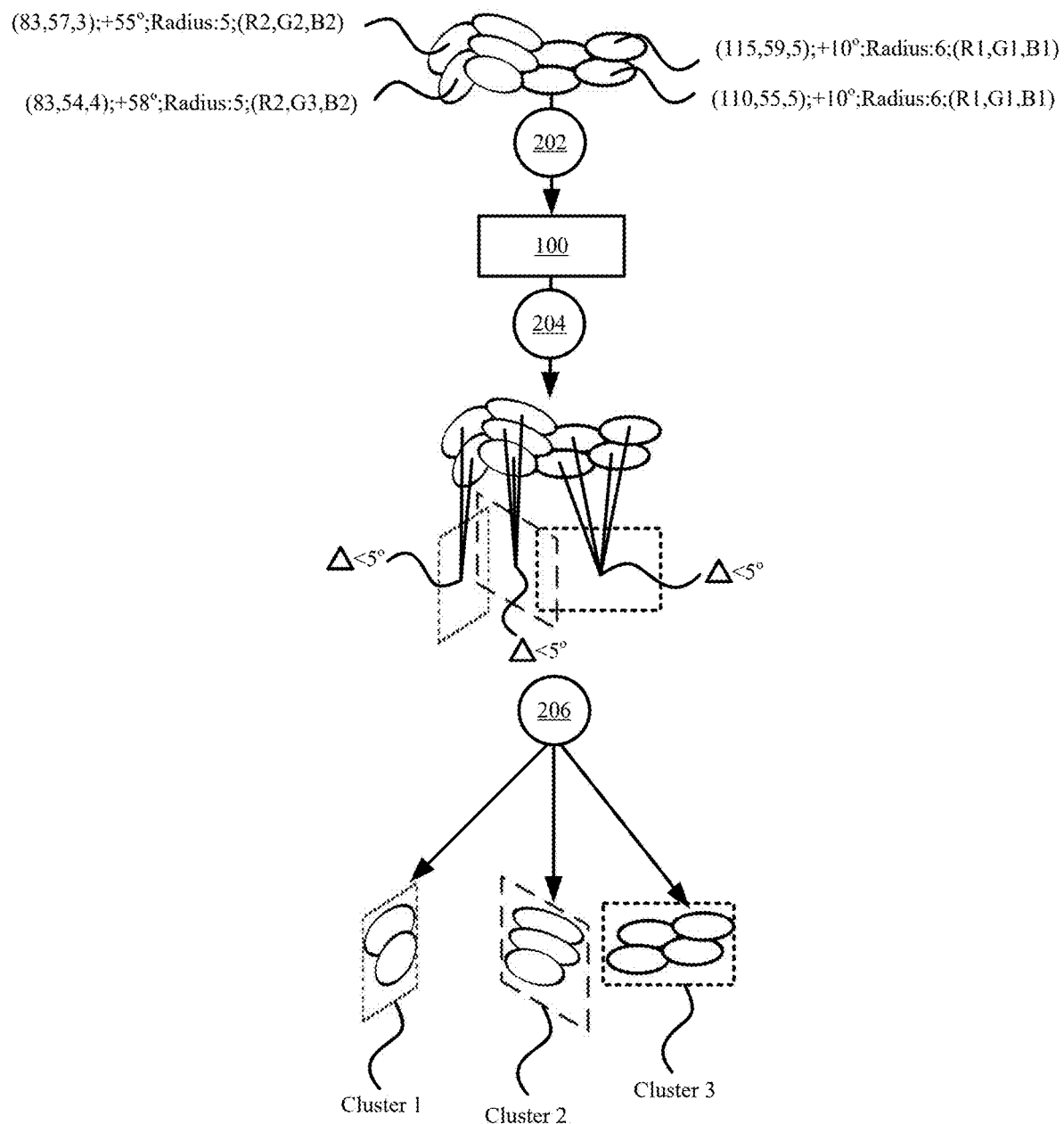
FIG. 2 illustrates an example of clustering the splat data for compression into textures in accordance with some embodiments presented herein.

FIG. 2 illustrates an example of clustering the splat data for compression into textures in accordance with some embodiments presented herein. Splat compression system 100 receives (at 202) original splat data. The original splat data includes individually defined splats. Specifically, each splat is defined with its own set of positional data and visual characteristic data.

Splat compression system 100 analyzes (at 204) the positional data of neighboring splats for commonality about different planes. To have commonality about a plane, the splats do not have to lie exactly on the surface of the plane. In some embodiments, the splats may partially or wholly deviate from the surface of the plane by a threshold amount or distance. For instance, a splat that is parallel to the plane but offset by a threshold distance from the plane may still be evaluated as having commonality with the plane. Similarly, a splat that intersects above and below a plane by a threshold distance may still be evaluated as having commonality with the plane.

The analysis (at 204) may include identifying the greatest number of splats that can be grouped to the fewest number of planes to maximize the number of splats that are included in the clusters which, in turn, yields the largest data reduction. Constraints may be placed on the number of splats that may be included in a cluster or the maximum size of the region that is spanned by a splat.

Splat compression system 100 groups (at 206) a set of splats that are positioned about a common plane to a cluster. One or more splats may be grouped (at 206) to a cluster and each cluster may span a different sized or shaped region of the splat representation. Since the splats of a given cluster are positioned about a common plane or form a flat surface, the region spanned by each cluster may be a 2D region.

Figure 3:
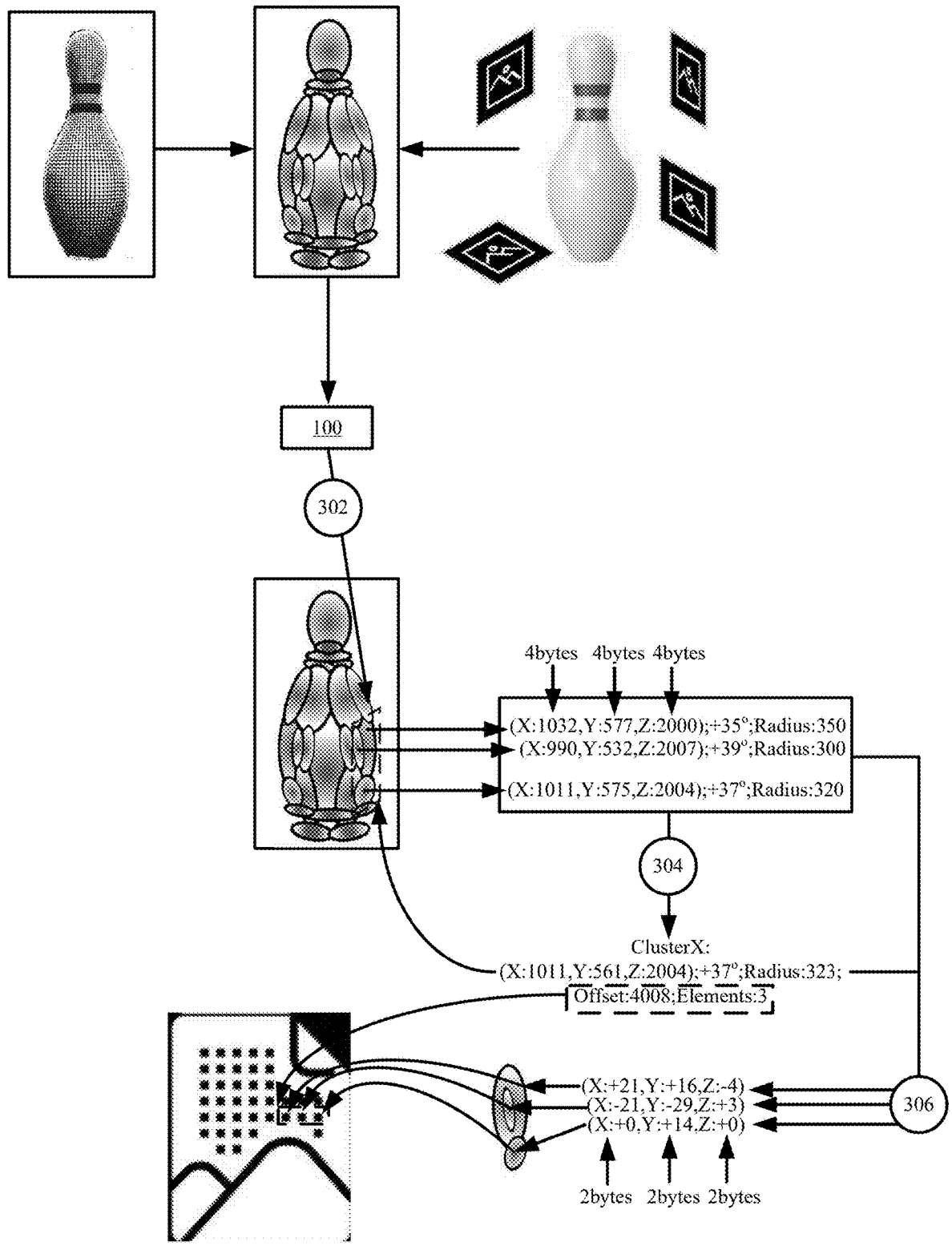
FIG. 3 illustrates an example of mapping the positional data of splats grouped to a particular cluster to a texture in accordance with some embodiments presented herein.

FIG. 3 illustrates an example of mapping the positional data of splats grouped to a particular cluster to a texture in accordance with some embodiments presented herein. Splat compression system 100 groups (at 302) three splats that are positioned about a common plane to the particular cluster.

Splat compression system 100 defines (at 304) parameters for the particular cluster based on the positional data of the grouped (at 302) splats and/or the common plane. The particular cluster parameters include one or more of a position, orientation, scaling value, offset, and number of elements.

In some embodiments, the particular cluster position may correspond to the center of the common plane about which the splats are grouped (at 302). For instance, the particular cluster position may be defined by averaging the positions of the grouped (at 302) splats. In some embodiments, the particular cluster position may correspond to the minimum x, y, and z coordinates of the splats in the particular cluster. In any case, the particular cluster position is used as a positional reference for creating a local coordinate system and the positions of the particular cluster splats are defined relative to the local coordinate system or as offsets from the particular cluster position.

The particular cluster orientation may be defined based on the orientation of the common plane or by averaging the orientation of the grouped (at 302) splats. In some embodiments, the particular cluster orientation is defined from the direction or angle of a normal associated with the common plane or the grouped (at 302) splats or a degree by which the splats are rotated relative to a reference plane.

The particular cluster scaling value may be derived from the scaling values of the grouped (at 302) splats. For instance, the particular cluster scaling value may be an average of the scaling value defined for each splat in the particular cluster. In some embodiments, the particular cluster scaling value is defined to represent the size of the region that is spanned by the grouped (at 302) splats. In some such embodiments, the particular cluster scaling value is selected to extend the particular cluster from its center position to the positional edges of the grouped (at 302) splats.

The particular cluster offset specifies where the positional data for the splats grouped (at 302) to the particular cluster start in the texture. The particular cluster offset may be determined based on the last byte written of the positional data of splats from a last cluster that was mapped and/or written to the texture. Accordingly, the particular cluster offset may represent a number of bytes within the texture from which to begin reading out the compressed positional data for the splats of the particular cluster.

The number of elements defined for the particular cluster represents the number of splats that are stored for the particular cluster in the texture. Based on the number of elements and the number of bytes used to store the compressed positional data for each splat in the texture, splat compression system 100 may determine the total number of bytes starting from the particular cluster offset in the texture that store compressed positional data for the splats of the particular cluster.

Splat compression system 100 maps (at 306) the positional data of the splats to the texture in a compressed format. The mapping (at 306) includes representing the splat positional data with less data in the texture than the positional data that is defined for each splat.

In some embodiments, the mapping (at 306) includes converting the splat positional data from the larger coordinate system or 3D space spanned by the entire splat representation to a local coordinate system associated with the particular cluster. In some such embodiments, the splat positional data that is mapped (at 306) to the texture includes offset coordinate values from the position of the particular cluster. For instance, if the x, y, and z coordinates of a first splat in the particular cluster are 100, 200, and 300, the x, y, and z coordinates of a second splat in the particular cluster are 90, 210, and 300, and the position defined for the particular cluster is 95, 205, and 300, then the mapping (at 306) may include storing offset values of 5 and −5 for the first splat in the texture and offset values of −5 and 5 for the second splat in the texture. In some embodiments, no offset value may be recorded for the z-coordinate when the z-coordinate represents the common plane associated with the particular cluster, the particular cluster is defined with that z-coordinate, and the z-coordinate from the particular cluster is assigned to each regenerated splat of the particular cluster. In some other embodiments, the common plane associated with the particular cluster is not defined about a single axis such that three offset values are stored for each splat in the texture.

The positional values stored to the texture have a smaller range of values than the positions defined in the larger coordinate space of the splat representation. Accordingly, less bits are required to store the splat positional data in the texture. For instance, each of the x, y, and z coordinates of each splat may be defined with a 4-byte data type (e.g., float or integer), whereas a 1-byte data type may be used to store the mapped or compressed positional values representing offsets from the reference position of the particular cluster.

Moreover, the mapping of the splat positional data to the local coordinate system of a corresponding cluster causes the converted positional values in different clusters to have a higher frequency of redundant or duplicate values. Accordingly, the mapping (at 306) may include quantizing the converted positional values to further reduce the amount of data that is needed to store the relative splat positions in the texture.

Figure 4:
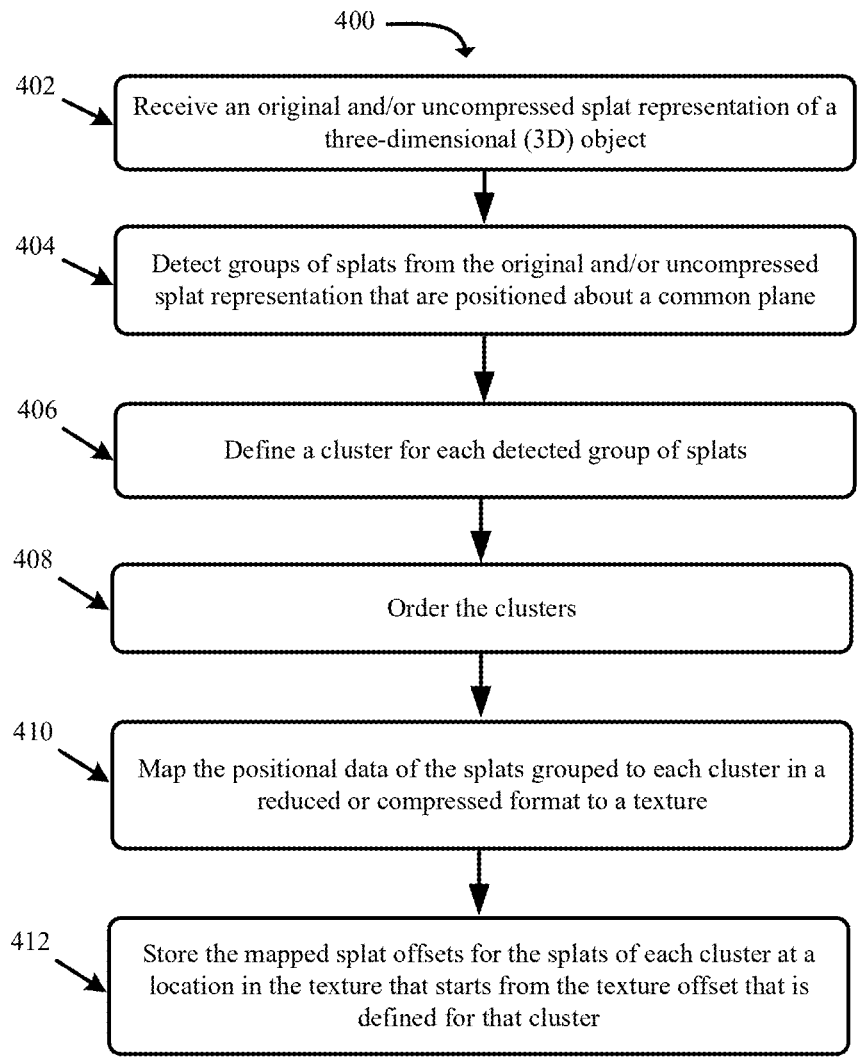
FIG. 4 presents a process for compressing the splat positional data in a texture based on a relative mapping of the splat positions to a cluster position in accordance with some embodiments presented herein.

FIG. 4 presents a process 400 for compressing the splat positional data in a texture based on a relative mapping of the splat positions to a cluster position in accordance with some embodiments presented herein. Process 400 is implemented by splat compression system 100. Splat compression system 100 includes one or more devices or machines with processor, memory, storage, network, and/or other hardware resources that are adapted for or configured to generate a compressed splat representation of a 3D object, wherein the compressed splat representation encodes each splat's positional data with less bits in one or more textures so that the compressed splat representation is reduced in size and has comparable fidelity, quality, or detail relative to the original and/or uncompressed splat representation.

Process 400 includes receiving (at 402) the original and/or uncompressed splat representation of a 3D object. The original and/or uncompressed splat representation is defined with a set of splats that collectively present the shape, form, and visual characteristics of the 3D object. Each splat of the set of splats is defined with a position and visual characteristics. In some embodiments, the splat position is defined using x, y, and z coordinates. The splat position may further include a normal for the orientation of the splat, a scaling value for the radius or shape of the splat that extends outwards from the splat position, and/or other positional values (e.g., rotation, covariance, etc.).

Process 400 includes detecting (at 404) groups of splats from the original and/or uncompressed splat representation that are positioned about a common plane. The detection (at 404) includes analyzing the positioning of the splats and identifying groups of splats that collectively form a flat surface, a relatively flat surface (e.g., deviate from the flat surface by less than a threshold amount), or that are positioned with a threshold proximity to a flat plane. Accordingly, splat compression system 100 searches for splats with positional coherence or positional commonality.

In some embodiments, splat compression system 100 may detect different groups of splats that are positioned about different planes and may select the groups that maximize the number of splats per group. For instance, a first splat may lie about a first common plane with a second splat and may lie about a second common plane with a third splat and a fourth splat. Splat compression system 100 will group the first splat with the third and fourth splats to maximize the number of splats in the group.

In some embodiments, splat compression system 100 may impose constraints when detecting (at 404) the groups of splats. In some such embodiments, splat compression system 100 may detect groups of splats that do not exceed a maximum number of splats per group and/or may detect groups of splats that each have more than a minimum number of splats per group (e.g., at least 3 splats per group). The constraints may improve the compression and the amount of data that is reduced when mapping the splat positional data to the texture.

Process 400 includes defining (at 406) a cluster for each detected (at 404) group of splats. Defining (at 406) the cluster includes creating a data structure that stores one or more of a position, orientation, scaling value, texture offset, and number of elements for the cluster. The cluster position may be defined from the positions of the splats in the group associated with the cluster. The cluster orientation represents the orientation of the plane against which the splats were group or the orientation of the grouped splats. The scaling value may be used to regenerate the splats with a shape that approximates the original shape of the grouped splats or that cumulatively spans the same region of 3D space as the original and/or uncompressed splats of the group. The texture offset specifies the position within the texture where the compressed positional data for the grouped splats is stored. The number of elements specifies the number of splats to regenerate based on the other cluster parameters and the compressed positional data stored in the texture starting from the texture offset position.

Process 400 includes ordering (at 408) the clusters. The clusters may be ordered (at 408) according to their positions in the 3D space of the splat representation. The ordering (at 408) allows for the positional data of splats in neighboring clusters to be encoded next to one another in the texture and for the splats in the neighboring clusters to be decoded one after the other rather than splats from clusters representing distant regions from being decoded one after the other. In other words, the ordering (at 408) improves memory locality such that the decoding and rendering of the splats occurs in a spatially relevant manner.

Process 400 includes mapping (at 410) the positional data of the splats grouped to each cluster in a reduced or compressed format to a texture. The mapping (at 410) includes generating a local coordinate system for the splats of each cluster, and converting the splat positional data (e.g., x, y, and z coordinates) from the larger coordinate system of the original and/or uncompressed splat representation to the significantly smaller local coordinate system of the cluster. The conversion between the coordinate systems involves defining the positions of the splats in a given cluster relative to the defined position of that cluster. Accordingly, the mapping (at 410) converts the discrete splat positions in the 3D space of the original and/or uncompressed splat representation to offsets from the cluster position.

The mapping (at 410) further includes encoding the splat offset position with less bits or in data types that require less data than the data types used to store the discrete splat positions in the original and/or uncompressed splat representation. For instance, the mapping (at 410) replaces 3 4-byte data types that store each of the x, y, and z positions of a splat in the original and/or uncompressed splat representation with 3 1-byte data types that store each of the x, y, and z offsets from the cluster position. The compression is made possible by reducing the range of values needed to represent the splat positions. In particular, significantly fewer discrete values are needed to represent a position in the local coordinate system with offsets from the cluster position than to represent a position in the entire 3D space spanned by all splats of the original and/or uncompressed splat representation. In some embodiments, splat compression system 100 further reduces the number of bits or amount of data that is needed to encode the splat offsets by quantizing the duplicative or redundant offsets created for the splats in different clusters.

Process 400 includes storing (at 412) the mapped (at 410) splat offsets (e.g., compressed positional data) for the splats of each cluster at a location in the texture that starts from the texture offset that is defined for that cluster. For instance, a first cluster may have a texture offset of 0, may have 2 splats, and the offset positions for each splat may be encoded in 3 bytes. Accordingly, the first 6 bytes of the texture may be used to store (at 412) offset positions for the 2 splats of the first cluster. A second cluster may have a texture offset of 7 and may have 3 splats with offset positions requiring 3 bytes of data for each splat. Splat compression system 100 stores (at 412) the 9 bytes for the offset positions of the splats in the second cluster starting from the 7th byte of the texture.

Other textures may be defined in a similar fashion for other positional data of the splats (e.g., orientation, scaling value, etc.) or for the visual characteristics of the splats (e.g., red, green, and blue color values). For instance, each cluster may be defined with color values that are averages of the color values of the splats in that cluster. The color values of the splats may then be represented in a compressed format in another texture as offsets from the color values of the cluster.

To improve the compression and maximize the number of splats for each cluster (e.g., number of splats on a common plane), splat compression system 100 may tune the training of the radiance field, neural network, and/or other machine learning process that is used to generate the splats of the original and/or uncompressed splat representation. Specifically, the model training may be modified to prioritize the generation of splats on common planes. In other words, the model may be trained to generate curved surfaces with smaller splats that have lesser planar or positional deviations between them or to generate a curved surface with splats that have larger planar or positional deviations such that the curved surface has larger flat surfaces with greater positional variance between them. In any case, the splat generation model is modified to minimize the number of planes against the which the generated splats are positioned and/or to maximize the number of splats that are positioned about the fewest number of planes.

Figure 5:
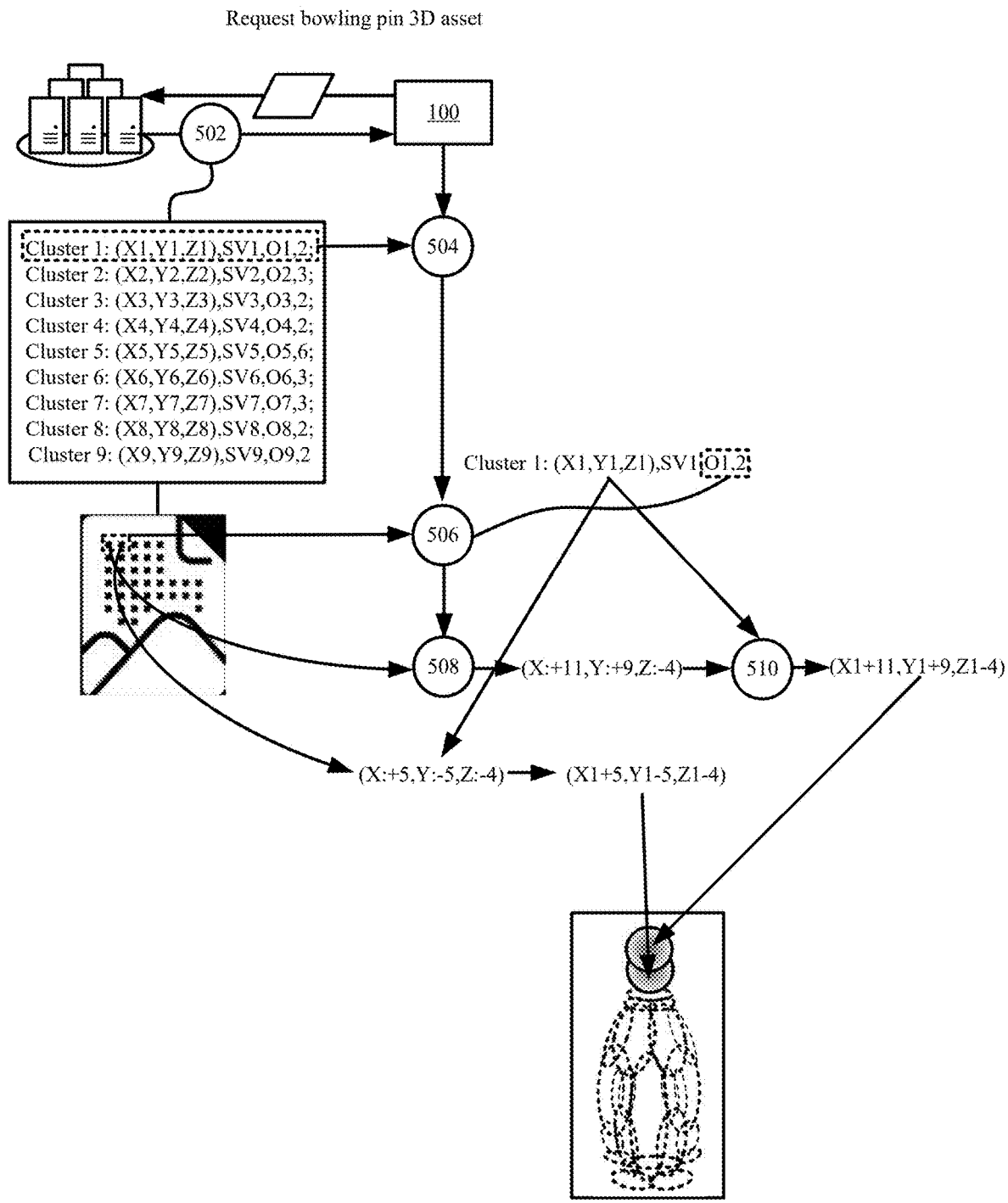
FIG. 5 illustrates an example of regenerating splats from a compressed splat representation in accordance with some embodiments presented herein.

FIG. 5 illustrates an example of regenerating splats from a compressed splat representation in accordance with some embodiments presented herein. In some embodiments, splat compression system 100 may regenerate the splats when it is running on a device that receives, decodes, and/or renders the compressed splat representation. In some such embodiments, splat compression system 100 may compress the splats of an uncompressed splat representation to one or more textures and may decompress or decode the one or more textures in order to regenerate the splats of the splat representation. In some other embodiments, a rendering engine running on a client device may use accelerated GPU resources to regenerate the splats from the compressed splat representation.

Splat compression system 100 receives (at 502) a compressed splat representation from a non-transitory computer readable storage medium or from another instance of splat compression system 100 that runs on a remote device. For instance, splat compression system 100 may issue a request to open, load, or present a 3D object. The request may specify the name, path, URL, or other identifier for accessing the 3D object data. In response to the request, splat compression system 100 may receive (at 502) the compressed splat representation instead of an uncompressed splat representation of the 3D object in order to reduce the bandwidth or memory needed to transfer or load the 3D object data.

The compressed splat representation includes the cluster definitions (e.g., the position, orientation, scaling value, texture offset, number of elements, etc. defined for each cluster) and the one or more textures storing the compressed splat data (e.g., compressed positional data and/or compressed visual characteristic data). In some embodiments, the compressed splat representation may be encoded to include uncompressed data. For instance, the visual characteristic data may not be compressed or encoded in a texture, and may be included in its original format (e.g., red, green, and blue color values for each splat) as part of the compressed splat representation.

Splat compression system 100 regenerates the splats by selecting (at 504) the definition of a particular cluster from the compressed splat representation. The selected (at 504) cluster definition includes one or more of a position, orientation, scaling value, texture offset, and number of elements.

Splat compression system 100 determines (at 506) the location in the received (at 502) texture at which the compressed positional data for the splats of the selected (at 504) particular cluster commences based on the texture offset specified in the particular cluster definition. The texture offset corresponds to a position or byte offset in the texture at which the compressed positional data for the first splat of the particular cluster is stored.

Splat compression system 100 reads (at 508) the compressed positional data for the first splat from the texture at the texture offset position. The compressed positional data is a fixed amount of data. For instance, the compressed positional data for each splat may be 3 bytes (e.g., 1 byte to represent each of the compressed or relative x, y, and z positions).

Regenerating the splats includes converting (at 510) the compressed or relative positional data for the first splat of the particular cluster from the texture to the original uncompressed positional data by adjusting the relative positional data according to the particular cluster position. In some embodiments, the compressed or relative positional data is defined as an offset from the particular cluster position. Accordingly, converting (at 510) the positional data includes adding to or subtracting from the coordinates of the particular cluster position in order to establish the position of the regenerated splat in the 3D space of the splat representation.

Regenerating the splats includes presenting (at 512) the regenerated splat at the decoded or converted (at 510) position in the 3D space of the splat representation with a shape and orientation of the regenerated splat defined according to the scaling value and orientation of the particular cluster. The scaling value may be used to set the radius or other parameter that defines the splat shape (e.g., ellipsoid, cone, cylinder, sphere, etc.). The orientation of the regenerated splat matches the orientation of the particular cluster.

The number of elements defined for the particular cluster specify the number of other splats that are regenerated with positions relative to the position of the particular cluster. Once a splat has been generated for each of the number of elements defined for the particular cluster, splat compression system 100 selects a next cluster from the compressed splat representation and regenerates a number of splats specified by the next cluster's number of elements at positions that are defined relative to the position of the next cluster. The process repeats until the splats for all clusters of the compressed splat representation have been regenerated.

In some embodiments, visual characteristics may be mapped from another texture to the regenerated splats. In some other embodiments, the visual characteristics may be stored in an array or other data structure according to the positioning of the splats, and the visual characteristics may be attributed to the regenerated splats based on their positioning in the 3D space and the ordering in the array or other data structure.

The decoding of the textures for splat regeneration may be performed directly using GPU resources (e.g., shaders or GPU compute units). The GPU resources accelerate the decoding of the textures and the splat regeneration. In particular, the GPU resources may include thousands of independent hardware circuits that may each simultaneously perform the mapping and conversion of different compressed positional data in the texture to the uncompressed positional data for the regenerated splats in the uncompressed or decoded splat representation. Consequently, the decoding of the texture and the splat regeneration may use no main memory and may be performed in tens or hundreds of milliseconds for millions of splats.

In some embodiments, the splat compression and different textures may be used to define a splat representation with different levels-of-detail (LoDs) or fidelity. In some such embodiments, the same cluster definitions may be associated with different textures. Each texture may store different compressed positional for regenerating the splats of a single splat representation with the different LoDs or fidelity. For instance, a first texture may store the compressed positional data with more data and greater positional accuracy (e.g., 2 bytes per local coordinate) than a second texture (1 byte per local coordinate). Similarly, a first texture may store the compressed coordinate values and a compressed or quantized scaling value to accurately recreate the shape of each splat for greater regenerative accuracy than a second texture that stores only the compressed coordinate values without a scaling value for each splat and instead relies on the scaling value of the associated cluster to define the shape of each regenerated splat. Regenerating splats based on the decoding of the first texture yields a first splat representation that has greater structural, positional, and/or form accuracy with an original and/or uncompressed splat representation than splats that are regenerated from decoding of the second texture. In some embodiments, the orientation values for each splat may also be stored in the texture or may be left out of the texture such that each regenerated splat inherits the orientation value of the cluster.

Figure 6:
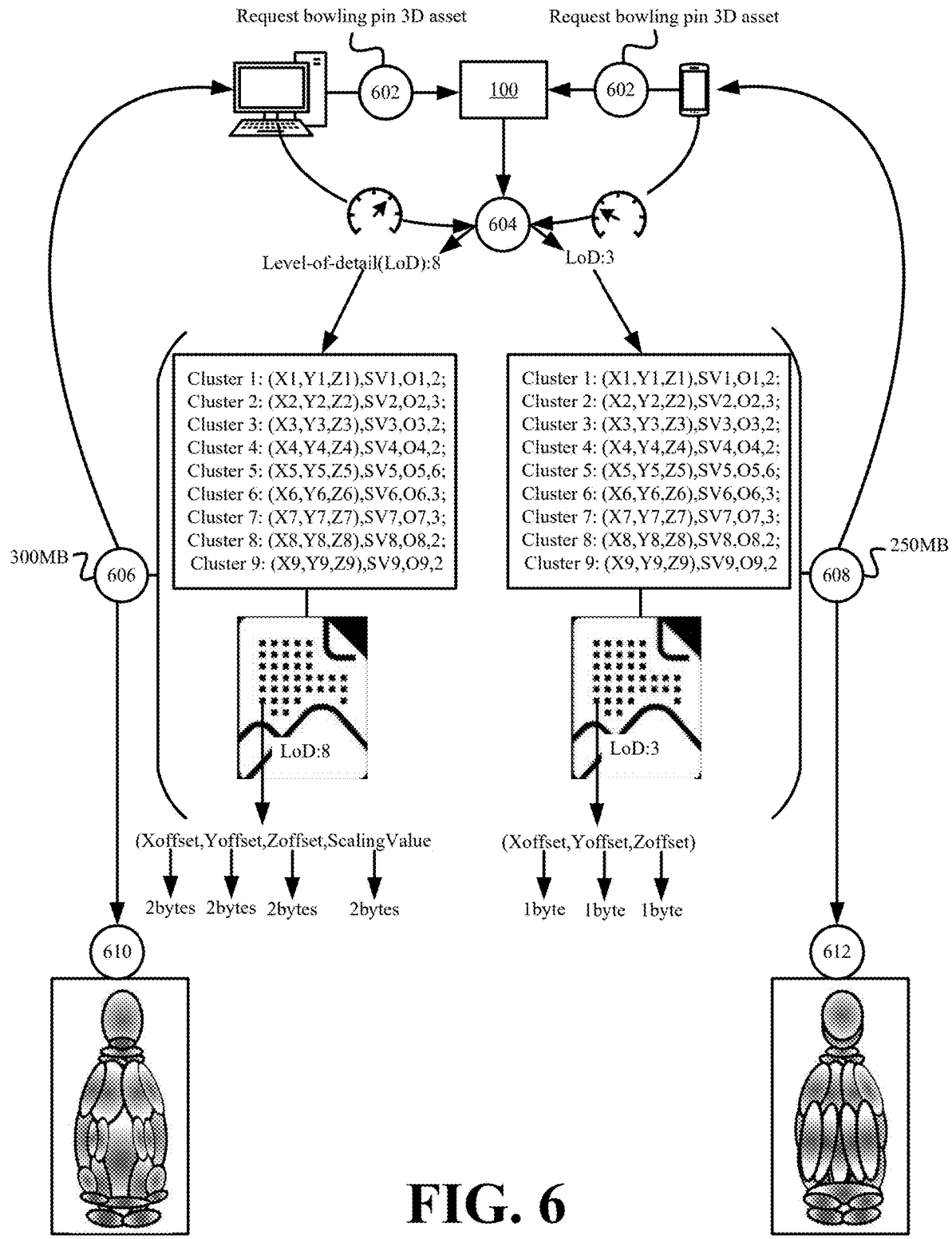
FIG. 6 illustrates an example of decoding a splat representation with different levels-of-detail (LoDs) from different textures in accordance with some embodiments presented herein.

FIG. 6 illustrates an example of decoding a splat representation with different LoDs from different textures in accordance with some embodiments presented herein. Splat compression system 100 receives (at 602) a first request for a 3D object from a first device and a second request for the 3D object from a second device.

Splat compression system 100 determines (at 604) different LoDs at which to present the 3D object to each requesting device. In some embodiments, the requests may specify the LoD at which 3D object is requested. In some other embodiments, splat compression system 100 tracks the network and/or rendering resources available for each of the first device and the second device and bases the LoD determination (at 604) on the amount of data that each device is able to receive over a period of time or is able to render at a consistent frame rate. For instance, splat compression system 100 may measure network performance over the different network paths connecting splat compression system 100 to the first device and the second device, and may determine that the network path to the second device has less bandwidth or greater latency than the network path to the first device. In some embodiments, the first and second requests may include information about the first and second device from which splat compression system 100 may determine that the network and/or rendering resources of the first device are greater than those of the second device. For instance, the requests may indicate the identify the device that submits each request and splat compression system 100 may perform a lookup to determine the rendering resources associated with each identified device.

Splat compression system 100 distributes (at 606) the cluster definition for a splat representation of the requested 3D object and a first texture encoding the splat positional data with a first LoD to the first device, and distributes (at 608) the cluster definition and a second texture encoding the splat positional data with a second LoD to the second device. In this example, the first texture defines the relative positional values for each splat with 6 bytes or with single-float or short-float data types and also defines a separate scaling value for each splat to compresses the splat representation at the higher or greater first LoD. The second texture defines the relative positional values for each splat with 3 bytes or with short integer or character data types and with no separate scaling value for each splat to compresses the splat representation at the lower or lesser second LoD. The total size of the cluster definition and the first texture is less than the total size of an original and/or uncompressed splat representation of the 3D object, and the total size of the cluster definition and the second texture is less than the total size of the cluster definition and the first texture.

The first device regenerates (at 610) splats with greater positional, shape, and structural accuracy to the original and/or uncompressed splat representation based on larger value ranges or individual splat scaling values stored in the first texture. The second device regenerates (at 612) splats with lesser positional, shape, and structural accuracy based on smaller value ranges stored in the second texture and attributed cluster scaling values to the regenerated splats.

Figure 7:
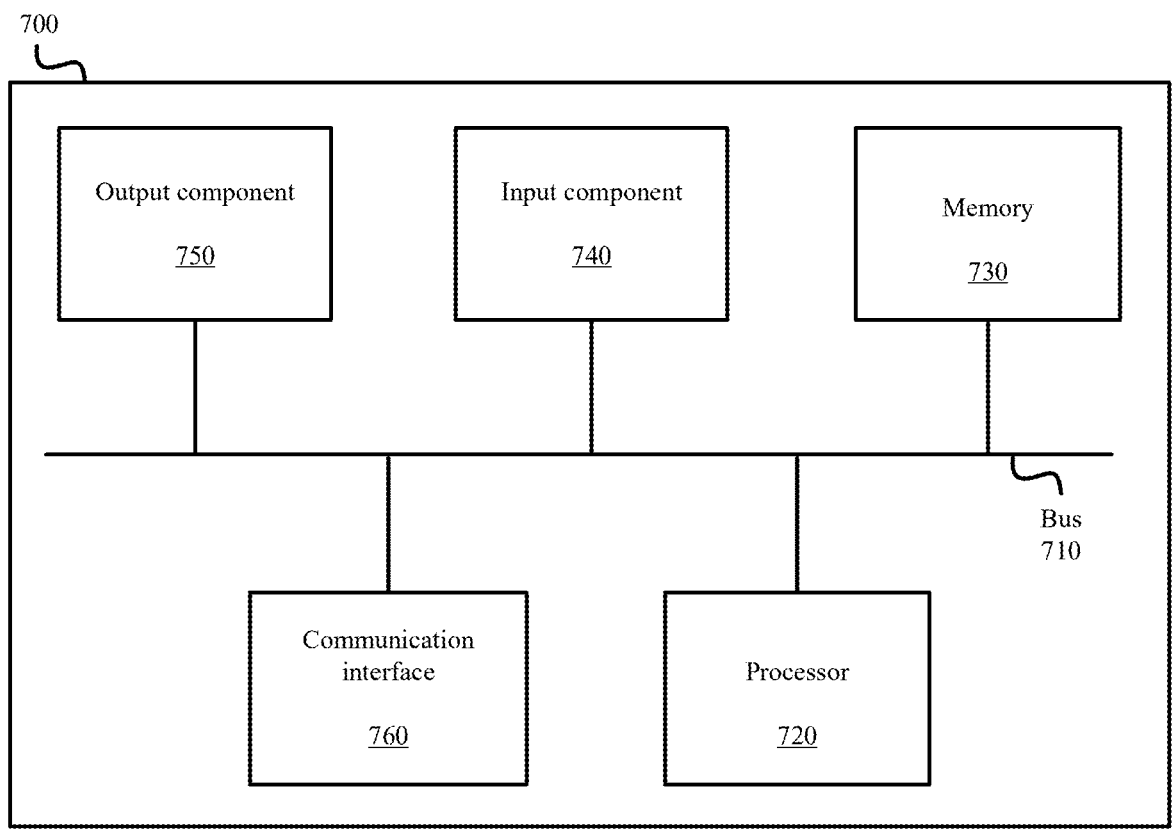
FIG. 7 illustrates example components of one or more devices, according to one or more embodiments described herein.

FIG. 7 is a diagram of example components of device 700. Device 700 may be used to implement one or more of the tools, devices, or systems described above (e.g., splat compression system 100, client devices, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
    receiving a three-dimensional (3D) representation comprising a plurality of splats that collectively generate a 3D visualization of one or more objects;
    determining a plurality of clusters with each cluster of the plurality of clusters being associated with a different set of splats from the plurality of splats positioned about a common plane;
    defining a respective cluster from the plurality of clusters with a position based on positional data from the different set of splats associated with the respective cluster;
    converting the positional data from the different set of splats associated with a different cluster of the plurality of clusters to offsets from the position of the different cluster that is associated with the different set of splats; and
    generating a compressed 3D representation comprising a definition for each cluster of the plurality of clusters and a texture that stores the offsets for the different set of splats associated with each cluster of the plurality of clusters, wherein the compressed 3D representation is encoded with less bits than the 3D representation.

2. The method of claim 1 further comprising:
    distributing the compressed 3D representation in response to a request for the 3D representation.

3. The method of claim 1 further comprising:
    detecting different groups that comprise two or more splats from the plurality of splats that are within a threshold distance of a different common plane; and
    associating the two or more splats from each group of the different groups to a different cluster of the plurality of clusters.

4. The method of claim 1, wherein defining the respective cluster comprises:
    defining each specific cluster from the plurality of clusters with a different offset into the texture and with a number of elements corresponding to a number of splats in the different set of splats associated with the specific cluster.

5. The method of claim 1, wherein defining the respective cluster comprises:
    specifying an offset into the texture that indicates a position in the texture at which to read compressed data for the different set of splats associated with a particular cluster from the texture.

6. The method of claim 1 further comprising:
    writing the offsets for each splat of the different set of splats associated with a specific cluster of the plurality of clusters into the specific cluster using a first data type that stores fewer bits than a second data type that is used to store the positional data of each splat from the plurality of splats in the 3D representation.

7. The method of claim 1, wherein converting the positional data to the offsets comprises:
    reducing from a first range of values used to represent the positional data to a smaller second range of values for the offsets.

8. The method of claim 1, wherein defining the respective cluster comprises:
    defining a scaling value for a particular cluster of the plurality of clusters based on different scaling values defined for the different set of splats associated with the particular cluster, wherein the different scaling values defined for the different set of splats are not stored in the texture.

9. The method of claim 8 further comprising:
    regenerating the different set of splats associated with the particular cluster at positions in a 3D space that are derived from the offsets of each splat from the different set of splats associated with the particular cluster and the position of the particular cluster; and
    defining shapes of the different set of splats associated with the particular cluster that are regenerated based on the scaling value of the particular cluster.

10. The method of claim 1, wherein defining the respective cluster comprises:
defining an orientation for a particular cluster of the plurality of clusters based on an orientation of each splat from the different set of splats associated with the particular cluster, wherein the orientation of each splat is not stored in the texture.

11. The method of claim 10 further comprising:
regenerating the different set of splats associated with the particular cluster at positions in a 3D space that are derived from the offsets of each splat from the different set of splats associated with the particular cluster and the position of the particular cluster; and
orienting the different set of splats that are associated with the particular cluster and that are regenerated based on the orientation defined for the particular cluster.

12. The method of claim 1 further comprising:
regenerating the plurality of splats by decoding positional values for the plurality of splats from the texture and by reference to the position of a cluster from the plurality of clusters that is associated with each regenerated splat.

13. The method of claim 1 further comprising:
regenerating the plurality of splats by simultaneously processing different parts of the texture using a plurality of compute units of a Graphics Processing Unit.

14. The method of claim 1 further comprising:
generating the plurality of splats for the 3D representation from different two-dimensional images that capture the one or more objects from different angles or perspectives.

15. The method of claim 1 further comprising:
generating the plurality of splats for the 3D representation from points of a point cloud or meshes of a mesh representation of the one or more objects.

16. A compression system comprising:
one or more hardware processors configured to:
receive a three-dimensional (3D) representation comprising a plurality of splats that collectively generate a 3D visualization of one or more objects;
determine a plurality of clusters with each cluster of the plurality of clusters being associated with a different set of splats from the plurality of splats positioned about a common plane;
define a respective cluster from the plurality of clusters with a position based on positional data from the different set of splats associated with the respective cluster;
convert the positional data from the different set of splats associated with a different cluster of the plurality of clusters to offsets from the position of the different cluster that is associated with the different set of splats; and
generate a compressed 3D representation comprising a definition for each cluster of the plurality of clusters and a texture that stores the offsets for the different set of splats associated with each cluster of the plurality of clusters, wherein the compressed 3D representation is encoded with less bits than the 3D representation.

17. The compression system of claim 16, wherein the one or more hardware processors are further configured to:
distribute the compressed 3D representation in response to a request for the 3D representation.

18. The compression system of claim 16, wherein the one or more hardware processors are further configured to:
detect different groups that comprise two or more splats from the plurality of splats that are within a threshold distance of a different common plane; and
associate the two or more splats from each group of the different groups to a different cluster of the plurality of clusters.

19. The compression system of claim 16, wherein defining the respective cluster comprises:
defining each specific cluster from the plurality of clusters with a different offset into the texture and with a number of elements corresponding to a number of splats in the different set of splats associated with the specific cluster.

20. A non-transitory computer-readable medium storing instructions that, when executed by one or more processors of a compression system, cause the compression system to perform operations comprising:
receiving a three-dimensional (3D) representation comprising a plurality of splats that collectively generate a 3D visualization of one or more objects;
determining a plurality of clusters with each cluster of the plurality of clusters being associated with a different set of splats from the plurality of splats positioned about a common plane;
defining a respective cluster from the plurality of clusters with a position based on positional data from the different set of splats associated with the respective cluster;
converting the positional data from the different set of splats associated with a different cluster of the plurality of clusters to offsets from the position of the different cluster that is associated with the different set of splats; and
generating a compressed 3D representation comprising a definition for each cluster of the plurality of clusters and a texture that stores the offsets for the different set of splats associated with each cluster of the plurality of clusters, wherein the compressed 3D representation is encoded with less bits than the 3D representation.

* * * * *